June 26, 1928.
C. E. SCHMUNK
GLASS MOLD MECHANISM
Filed Dec. 6, 1924
1,674,997
2 Sheets-Sheet 1
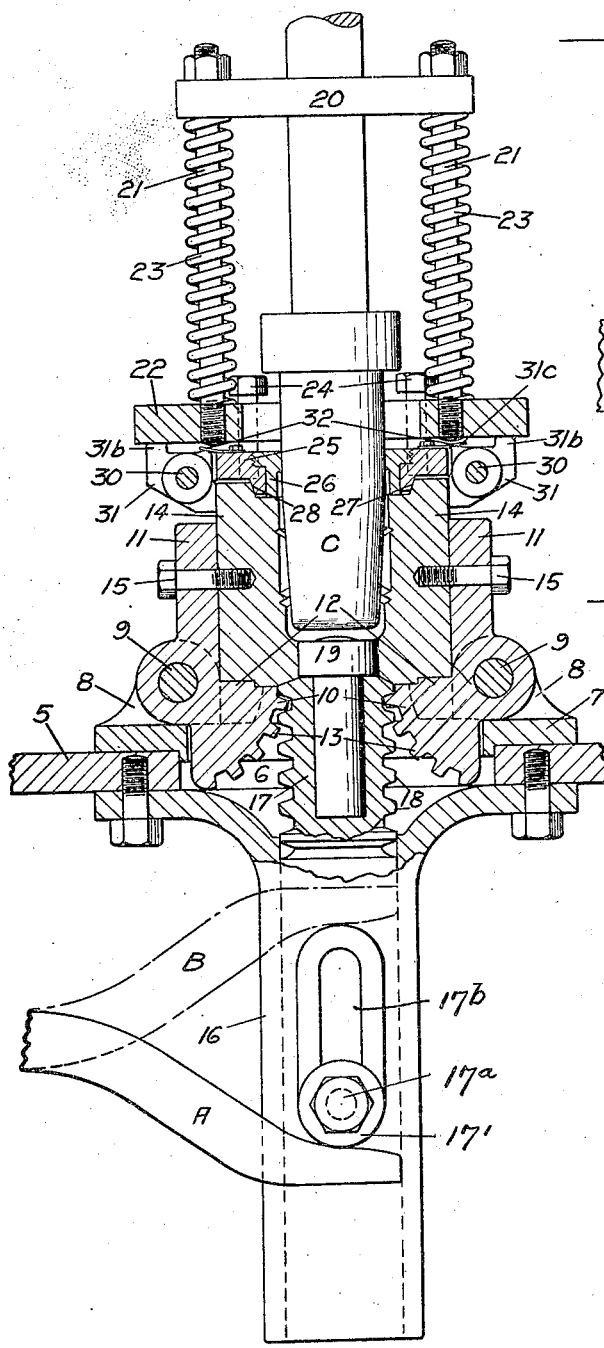
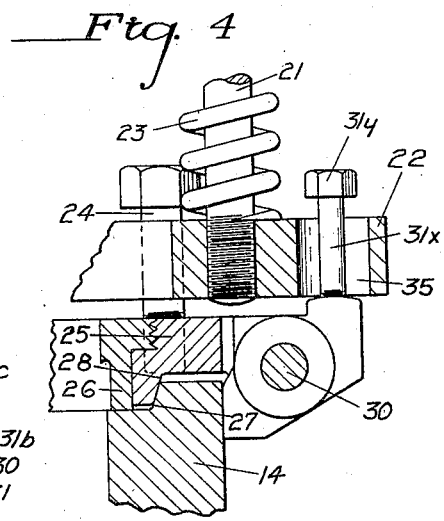
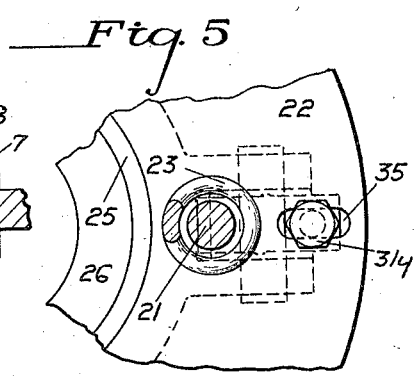
INVENTOR.
Charles E. Schmunk
BY W. D. Doolittle
ATTORNEY.

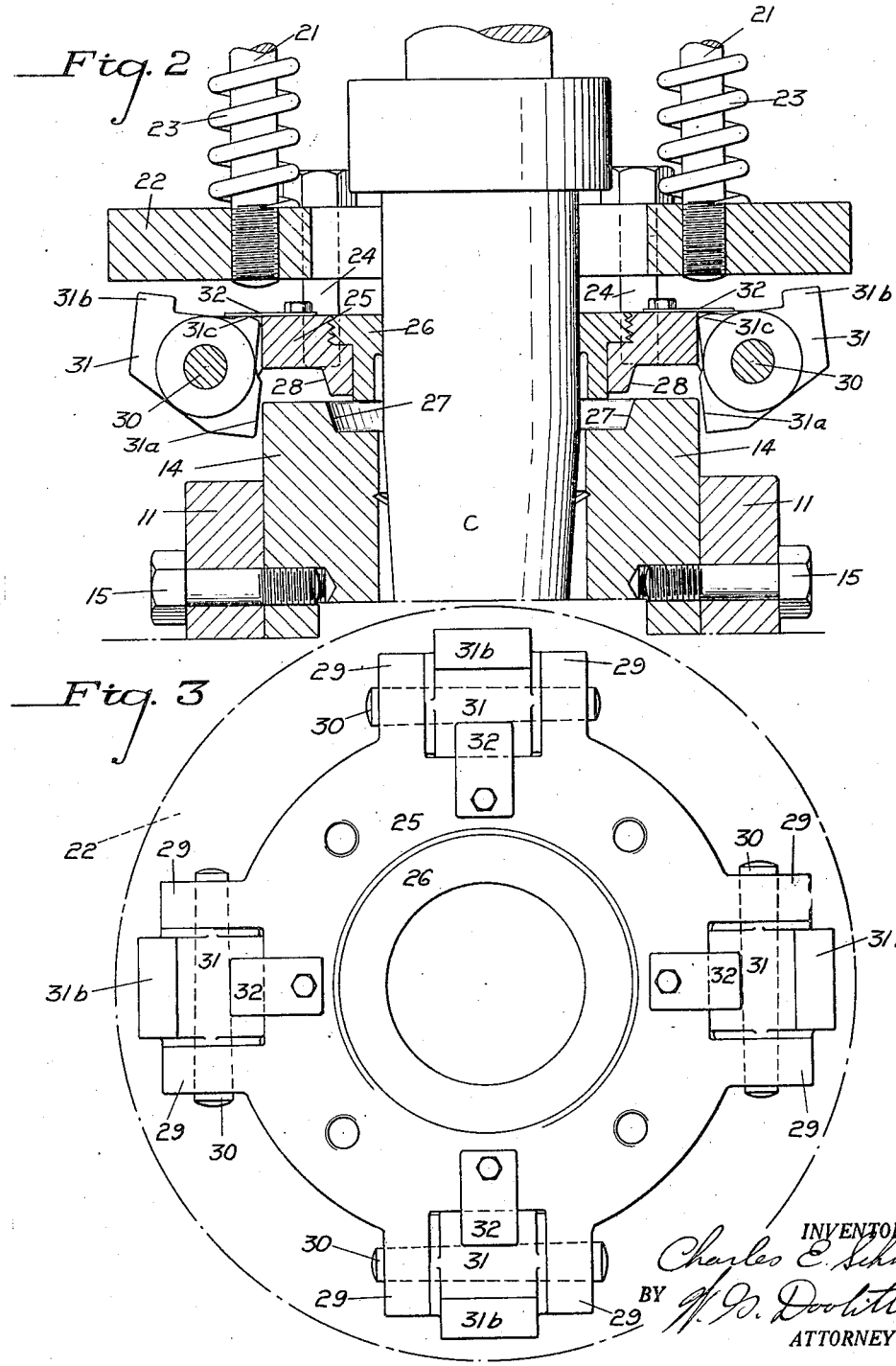

Patented June 26, 1928.

1,674,997

UNITED STATES PATENT OFFICE.

CHARLES E. SCHMUNK, OF CRAFTON, PENNSYLVANIA.

GLASS-MOLD MECHANISM.

Application filed December 6, 1924. Serial No. 754,311.

This invention is for an improvement in glass molding devices, and is particularly adapted for use with glass forming devices having divided relatively movable mold sections.

The invention is especially designed and adapted for use with a mold of the type disclosed in my co-pending application Serial No. 722,502, filed June 26, 1924.

In my said application, I have disclosed a divided mold wherein the mold-sections are mounted for movement on a horizontal axis to permit of their movement in a vertical arc, which effects the opening and closing of the mold. In the said application I have shown a central plunger, at whose upper end is a terminal that forms the bottom of the mold. The mold mounting includes a lateral arm at the base of each mold-section, on which are teeth for engagement with teeth on the central plunger. Upward movement of the plunger opens the mold and downward movement closes it.

The present invention has for its objects to provide means for cooperation with the top of the divided mold which will effectively prevent spreading or opening of the mold except as desired.

A further object of the invention is to provide a locking device carried by and operable through the pressing mechanism.

A further object of the invention is to provide an extremely simple mechanism for this purpose, but which will be positive in its action.

The invention may be best understood by reference to the accompanying drawings, which illustrate the idea of the invention, but to the details of which the invention is not confined. In the drawings:

Fig. 1 indicates a vertical section through a mold and pressing mechanism including my invention, showing the plunger in pressing position;

Fig. 2 is a view similar to Fig. 1, with much of the machine shown in Fig. 1 being broken away, the parts being shown with the plunger retracted;

Fig. 3 is a top plan view of the locking ring which involves the present invention;

Fig. 4 is a sectional view generally similar to Fig. 1, showing a slightly modified form;

Fig. 5 is a top plan view generally similar to Fig. 3, showing the modification of Fig. 4.

The invention is adaptable to various types of automatic pressing machines, which machines generally comprise a rotary mold carrying table, movable step by step to successively bring each mold of a series carried thereon to the various stations. These machines being old and well known, I have only shown such portions of the machine as is necessary to illustrate the present improvement.

In the drawings, 5 designates the usual carrier or supporting table of an automatic machine. Secured over an opening 6 in the table is a bed plate or ring 7 on which are a suitable number of pairs of spaced apart ears 8.

Secured between each pair of ears, on a pivot or pin 9, which passes through the ears, is a mold part carrying member 10, which is in effect a bell crank, having a vertical arm 11 and a horizontal extension 12, the extension 12 being directed toward the center of the opening 6.

On each extension 12 is an arcuate row of gear teeth 13, the extension 12 corresponding generally to a sector of a gear wheel. Secured to each pivotal mold carrier is a mold part 14 whose upper end preferably reaches above the top of the carrier. I have shown bolts 15 for securing mold parts 14 in place. This permits of the use of interchangeable molds.

Depending from the table below the opening 6 is a tubular guide 16, within which is a vertically reciprocable plunger 17, generally similar to that now used in machines of this type, but having rack teeth 18 thereon in mesh with teeth 13. Removably carried on the top of this plunger is the usual interchangeable mold bottom 19.

A cam roller 17′ may be provided on the end of a transverse pin 17$^a$, carried by plunger 17 and projecting through a vertical slot 17$^b$ in the tubular guide 16. This cam roller engages a stationary raising cam track A and a depressing cam track B.

It will be understood that when the plunger 17 is raised, the interengaged gear teeth 13 and 18 will cause the mold sections to swing through a vertical arc about their pivots, opening the mold. The upward moving mold bottom will at the same time raise the pressed article in the customary manner.

So much of the apparatus as has just been described is the subject of my co-pending application above referred to.

It will be seen that during the pressing operation any downward pressure on the bottom of the mold caused by the pressing plunger will tend to hold the mold together. However, to insure against any spreading of the mold during the pressing of an article, the present locking mechanism has been devised.

The plunger C is of the usual construction, operated in the usual manner in machines of this kind. Near the top of the plunger is the usual cross head 20 through which slidably pass bolts 21, from which is suspended the usual spring plate 22. Around the bolts 21 are heavy compression springs 23, as usually provided. The plunger passes freely through a central opening in the spring plate, so that it may, upon the movement of the spring plate being halted, move relatively thereto in the usual manner, and at which time springs 23 are put under added compression.

Suspended from the spring plate by bolts or rods 24 slidably passing therethrough, is a mold-ring 25 which preferably has a removable central ring 26 therein. This ring closes the top of the mold during the pressing operation, shapes the top of the ware being molded, and guides the pressing plunger.

The top of the mold sections 14 are preferably recessed near their center, the wall of the recess being beveled, as indicated by 27. The under surface of ring 25—26 is correspondingly projected, with an inclined surface 28 for cooperation with slope 27. This will function to insure proper centering of the mold under the plunger.

At suitably located points on the periphery of ring 25 are spaced apart lugs 29. Between each pair of lugs, on a pivot or pin 30, is a locking element or toggle 31, having a vertical face 31ª for engagement with the outside wall of a mold section, and an upward projection 31ᵇ for contact with the spring plate. Leaf springs 32 may be provided to bear against a heel 31ᶜ on the toggle to positively hold the toggle open when the parts are out of mold engaging position, although if suitably balanced, this spring, while desirable, is not essential.

The operation may now be followed. Assuming a mold, which is closed and contains its charge, moves under the press. The press starts to lower, and with it, the spring plate and mold ring. The mold ring first engages the top of the mold, at which time inclined surfaces 27 and 28 come into contact, and, as the mold ring lowers, these surfaces cause the mold if slightly out of alinement to move directly into position. When the downward limit of the mold ring is reached, the depending parts 31ª of toggles 31 will be around the outside of the divided mold. Spring plate 22 will be free to move downward slightly, and as it moves down, it will engage toggle extensions 31ᵇ and apply pressure thereto, rocking the toggles on their pivots to force parts 31ª into clamping relation with the mold. At this time, the plunger will only be entering the mold.

As the plunger moves down, and spring plate 22 can move no further, springs 23 begin to compress until the time when the plunger reaches its downward limit of travel. The pressure on springs 23 is, of course, transmitted to the mold ring, forcing it down on top of the mold and urging the toggles into tighter clamping engagement with the mold, thereby effectively overcoming any tendency of the mold to spread.

After the completion of the downward stroke of the plunger, it will move up, relieving the pressure on springs 23 and eventually lifting the spring plate. As the spring plate starts to move up, the pressure on the toggles is relieved. The spring plate in turn will lift the mold ring until it clears the mold and at the same time, leaf springs 32 will function to swing the toggles to an open position.

After the pressing operation, it will be understood that the mold moves to another position where it opens and the pressed ware is discharged, as described in my said copending application.

In Figs. 4 and 5 I have illustrated a slightly modified form wherein the leaf springs 32 are omitted. In this form of the invention, the toggles 31 have bolts 31ˣ thereon that pass through slots 35 in the spring plate, the bolts having heads 31ʸ. When the parts are in mold locking position, the spring plate presses down on the top of the toggles, as hereinafter explained, to rock them into holding position. When the spring plate lifts however, the heads of the bolts are engaged by the spring plate and the toggles, from which the weight of ring 25—26 is suspended, would be rocked to open position.

The mold ring 25 can be made in various sizes to be interchangeable with different sizes of divided molds, and the number of locking toggles may be varied in accordance with the number of sections in the mold. The removable ring 26 for guiding the plunger permits of interchanging of this part without substituting an entirely new mold ring.

Various changes and modifications are contemplated within the spirit of the invention and are within the scope of the appended claims.

I claim as my invention:

1. The combination with a divided mold having pivoted mold sections and plunger mechanism for cooperation therewith, of a locking member for the mold associated with and operable through the plunger mechanism, said mechanism including a carrier member movable with the plunger and having a limited free movement relatively thereto, said member having pivoted relatively movable mold engaging members supported thereon.

2. The combination with a mold having a plurality of relatively movable sections and a plunger mechanism for cooperation therewith, of a locking means for the mold including a movable holder having pivoted clamping members thereon associated with the plunger mechanism and operable through the plunger mechanism, said plunger being relatively movable with respect to the locking means.

3. The combination with a divided mold having a plurality of sections horizontally pivoted at their lowermost ends of a vertically reciprocable locking means movable into and out of operative engagement therewith for holding the sections against spreading when in operative engagement therewith.

4. The combination with a divided mold having a plurality of relatively movable sections, of a plunger, a spring plate associated with the plunger, a mold ring movably suspended from the spring plate, and pivotally mounted means on the mold ring operable through the spring plate for clamping the mold sections to prevent spreading thereof during the pressing operation.

5. The combination with a divided mold having a plurality of horizontally pivoted sections, of a pressing plunger, a spring plate associated with the plunger, and radially movable locking means for the mold associated with and movably suspended from the spring plate and operable thereby.

6. The combination with a divided mold having a plurality of horizontally pivoted sections, of a pressing plunger, a spring plate associated therewith, a mold ring suspended from the spring plate and having a limited vertical movement with respect thereto, a plurality of clamping elements on the mold ring movable into and out of engagement with the mold sections, and means on the clamping elements for engagement with the spring plate for effecting the operation thereof when said spring plate moves downward with respect to the mold ring.

7. The combination with a divided mold having a plurality of horizontally pivoted sections, of a pressing plunger, a spring plate associated therewith, a mold ring suspended from the spring plate and having a limited vertical movement with respect thereto, a plurality of toggle elements on the mold ring movable about a horizontal axis into and out of engagement with the mold sections, and abutments on the toggles for contact with the spring plate, whereby the downward movement of the spring plate with respect to the ring will apply pressure to the toggles to move them into clamping engagement with the mold sections.

8. The combination with a divided mold having a plurality of horizontally pivoted sections, of a pressing plunger, a spring plate associated therewith, a mold ring suspended from the spring plate and having a limited vertical movement with respect thereto, a plurality of toggle elements on the mold ring movable about a horizontal axis into and out of engagement with the mold sections, and abutments on the toggles for contact with the spring plate, whereby the downward movement of the spring plate with respect to the ring will apply pressure to the toggles to move them into clamping engagement with the mold sections, and means for rocking the toggles out of mold engaging position when the spring plate moves upwardly with respect thereto.

In testimony whereof I affix my signature.

CHARLES E. SCHMUNK.